US012766780B2

(12) United States Patent
Lee et al.

(10) Patent No.: US 12,766,780 B2
(45) Date of Patent: Oct. 20, 2026

(54) COMPOSITE MATERIAL PULTRUSION DEVICE

(71) Applicants: HYUNDAI MOTOR COMPANY, Seoul (KR); Kia Corporation, Seoul (KR)

(72) Inventors: Kyuyoung Lee, Hwaseong-si (KR); Dong il Kum, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 147 days.

(21) Appl. No.: 18/942,173

(22) Filed: Nov. 8, 2024

(65) Prior Publication Data

US 2026/0008224 A1 Jan. 8, 2026

(30) Foreign Application Priority Data

Jul. 3, 2024 (KR) ........................ 10-2024-0087265

(51) Int. Cl.

*B29C 70/52* (2006.01)
*B29C 53/00* (2006.01)
*B29C 53/02* (2006.01)
*B29C 53/84* (2006.01)

(52) U.S. Cl.

CPC ............ *B29C 53/02* (2013.01); *B29C 53/005* (2013.01); *B29C 53/84* (2013.01)

(58) Field of Classification Search

CPC ..... B29C 70/52; B29C 70/527; B29C 70/525; B29C 70/523; B29C 55/30

See application file for complete search history.

(56) References Cited

U.S. PATENT DOCUMENTS 3,657,040 A * 4/1972 Shobert ................ F41B 5/0063 156/181
5,086,705 A * 2/1992 Jarvis .................... F16C 29/045 105/157.1
2005/0140045 A1* 6/2005 Okamoto ........... B29D 99/0003 425/391
2009/0078362 A1* 3/2009 Wilkerson .............. B29C 70/52 156/201
2009/0206515 A1* 8/2009 Jansen .................. B29C 70/525 425/445
2018/0311917 A1* 11/2018 Klimovski ............ B29C 70/527
2022/0332061 A1* 10/2022 Schmidhuber ........ B29C 70/521

FOREIGN PATENT DOCUMENTS

KR 10-2021-0077063 A 6/2021
KR 10-2022-0161964 A 12/2022

* cited by examiner

*Primary Examiner* — Matthew J Daniels
(74) *Attorney, Agent, or Firm* — Fish & Richardson P.C.

(57) ABSTRACT

A composite material pultrusion device is configured to pultrude a curved composite material part having a set curvature. The composite material pultrusion device includes: i) a fiber material supply for supplying a fiber material along a material transportation path inclined in an up-down direction; ii) a molding mold including a pultrusion passage horizontally connected with the material transportation path, and installed on a round-shaped curved rail to be movable, the curved rail being mounted on a base frame along a pultrusion line; and iii) a pull-cutter installed on the curved rail to be movable towards or away from a molding mold along the pultrusion line to pull and cut a material molded article molded by the molding mold.

19 Claims, 12 Drawing Sheets

100

100

COMPOSITE MATERIAL PULTRUSION DEVICE

CROSS-REFERENCE TO RELATED APPLICATION

This application claims priority to and the benefit of Korean Patent Application No. 10-2024-0087265, filed in the Korean Intellectual Property Office, on Jul. 3, 2024, the entire contents of which are incorporated herein by reference.

TECHNICAL FIELD

The present disclosure relates to a system for manufacturing a plastic composite material part, and more particularly, to a composite material pultrusion device pultruding a vehicle body part made of a plastic composite material having a curvature.

BACKGROUND

A plastic composite material may be used in aviation and automobile fields due to its excellent strength, elasticity, lightness, and stability.

For instance, a vehicle body part made of a plastic composite material for high strength and light weight has been applied to a vehicle body in accordance with a carbon reduction policy and a fuel efficiency enhancement regulation.

An example of the plastic composite material may include carbon fiber reinforced plastic (CFRP) or glass fiber reinforced plastic (GFRP).

In some cases, the vehicle body part made of the plastic composite material may be manufactured by, for example, a pultrusion device using a pultrusion method.

The pultrusion method using the plastic composite material refers to a method of continuously forming the vehicle body part made of the plastic composite material having a cross-section.

For example, the pultrusion device may impregnate a fiber material continuously supplied along a set guide path with resin, and may mold the fiber material impregnated with the resin into a set shape by a molding mold.

In some cases, the pultrusion device may pull and remove a molded article of the fiber material formed using the molding mold that applies heat and pressure, and cut the molded article to a set length.

In some cases, a pultrusion device may form a straight vehicle body part due to a feature of the pultrusion method in which the vehicle body part is formed by pulling the molded article of the fiber material in a certain direction. The pultrusion method used by the pultrusion device may not produce, for example, the vehicle body part made of a curved plastic composite material having a curvature.

SUMMARY

The present disclosure describes a composite material pultrusion device which may pultrude a curved composite material part having a set curvature.

According to one aspect of the subject matter described in this application, a composite material pultrusion device is configured to pultrude a curved composite material part. The device includes a base frame, a curved rail that is disposed at the base frame and defines a pultrusion line, a fiber material supply configured to supply a fiber material along a material transportation path that is inclined in an up-down direction relative to the base frame, a molding mold that defines a pultrusion passage connected to the material transportation path, the molding mold being disposed on the curved rail and configured to move along the pultrusion line, and a pull-cutter disposed at the curved rail and configured to move toward or away from the molding mold along the pultrusion line, the pull-cutter being configured to pull and cut a molded article that is molded by the molding mold.

Implementations according to this aspect can include one or more of the following features. For example, the device further includes a resin supply connected to upper and lower parts of the molding mold and configured to supply resin into the pultrusion passage, and a heater disposed at the molding mold and configured to apply heat to the pultrusion passage. In some examples, the molding mold and the pull-cutter are disposed at the curved rail and spaced apart from each other, where a separation distance between the molding mold and the pull-cutter varies based on a curvature of the curved composite material part. The device may further include a material input port connected to the molding mold and configured to provide the fiber material to the molding mold, where an input angle of the fiber material into the material input port varies based on a position of the molding mold.

In some implementations, the fiber material supply may include a creel comprising a plurality of yarn bobbins that are wound with fiber yarns, a pair of stands that are disposed at one side of the creel, and a fiber yarn guide disposed between the pair of stands and inclined in the up-down direction, the fiber yarn guide being configured to move in the up-down direction according to the input angle of the fiber material and configured to guide the fiber yarns unwound from the plurality of yarn bobbins to the material transportation path.

In some examples, each of the pair of stands may include a support frame, and a lifting member disposed at the support frame and configured to be moved in the up-down direction, where the device may further include a lifting driver disposed at the support frame and configured to move the lifting member in the up-down direction. In some examples, the fiber yarn guide may include a base plate coupled to the lifting member, and a plurality of yarn guide rollers disposed at the base plate.

In some implementations, the device may include a fiber nonwoven fabric supply configured to supply a fiber nonwoven fabric, where the fiber material supply may further include a material guide connected to the fiber yarn guide and configured to guide the fiber nonwoven fabric along the material transportation path. In some examples, the material guide may include a guide frame coupled to the lifting member of one of the pair of stands that is disposed adjacent to the molding mold, and a plurality of material guide plates disposed at the guide frame along the material transportation path.

In some implementations, the device may include a plurality of guide pipes fixed to the base frame in the up-down direction, where the guide frame may include a plurality of support rods that are fitted to the plurality of guide pipes in the up-down direction. In some examples, the fiber nonwoven fabric supply may include a plurality of nonwoven fabric bobbins disposed at one of the pair of stands that is disposed adjacent to the molding mold, the guide frame, and the base frame.

In some implementations, the fiber material supply may further include a yarn guide plate disposed between the creel and one of the pair of stands, the yarn guide plate defining a number of guide holes through which the fiber yarns pass. In some examples, the molding mold may include a mold support member disposed at the curved rail and configured to move along the pultrusion line, and a lower die and an upper die that are disposed at the mold support member and configured to define the pultrusion passage.

In some implementations, the device may include a mold driver disposed at the base frame and configured to move the mold support member along the pultrusion line. In some implementations, the pull-cutter may include a puller support member disposed at the curved rail and configured to move along the pultrusion line, a puller disposed at the puller support member, and a cutter disposed at the puller.

In some examples, the device may include a unit driver disposed at the base frame and configured to move the puller support member along the pultrusion line. In some examples, the molding mold may further include at least one mandrel core disposed in the pultrusion passage between the upper die and the lower die. In some examples, the molding mold may further include a sag detection sensor disposed at the pultrusion passage and configured to detect sagging of the at least one mandrel core.

In some implementations, the device may include a resin supply connected to upper and lower parts of the molding mold and configured to supply resin into the pultrusion passage, where the resin supply may include a pressure regulator configured to regulate a pressure of the resin supplied to the lower part of the molding mold based on a detection signal of the sag detection sensor.

The composite material pultrusion device may pultrude the curved composite material parts of various specifications that have different curvatures by using the simple configuration, thus securing the productivity and quality of the curved composite material parts.

Other effects which may be acquired or predicted by the implementations of the present disclosure are disclosed directly or implicitly in the detailed description of the implementations of the present disclosure. That is, various effects predicted based on the implementations of the present disclosure are disclosed in the detailed description described below.

BRIEF DESCRIPTION OF THE DRAWINGS

Implementations in the specification may be better understood by reference to the following description in connection with the accompanying drawings in which like reference numerals refer to identical or functionally similar elements.

It should be understood that the drawings referenced above are not necessarily drawn to scale, and present a rather simplified representation of various features showing the basic principles of the present disclosure. For example, specific design features of the present disclosure, including its specific dimension, orientation, position, and shape, are determined in part by the particular intended application and environment of use.

DETAILED DESCRIPTION

Terms used in the specification is only provided to describe specific implementations of the present disclosure, and is not intended to limit the present disclosure. Terms of a singular number used in the specification are intended to include its plural number unless the context clearly indicates otherwise.

In the present disclosure, "vehicle," "of a vehicle," "automobile" or other similar terms used herein generally refer to a passenger vehicle including a sports car, a sport utility vehicle (SUV), a bus, a truck and a passenger automobile including various commercial vehicles, and also refer to a hybrid vehicle, an electric vehicle, a hybrid electric vehicle, a hydrogen-powered vehicle, a purpose built vehicle (PBV) based on the electric vehicle, a light commercial vehicle (LCV) based on the hydrogen electric vehicle, and a vehicle using another alternative fuel (e.g., fuel derived from a resource other than petroleum).

Hereinafter, the implementations of the present disclosure are described in detail with reference to the accompanying drawings.

Figure 1:
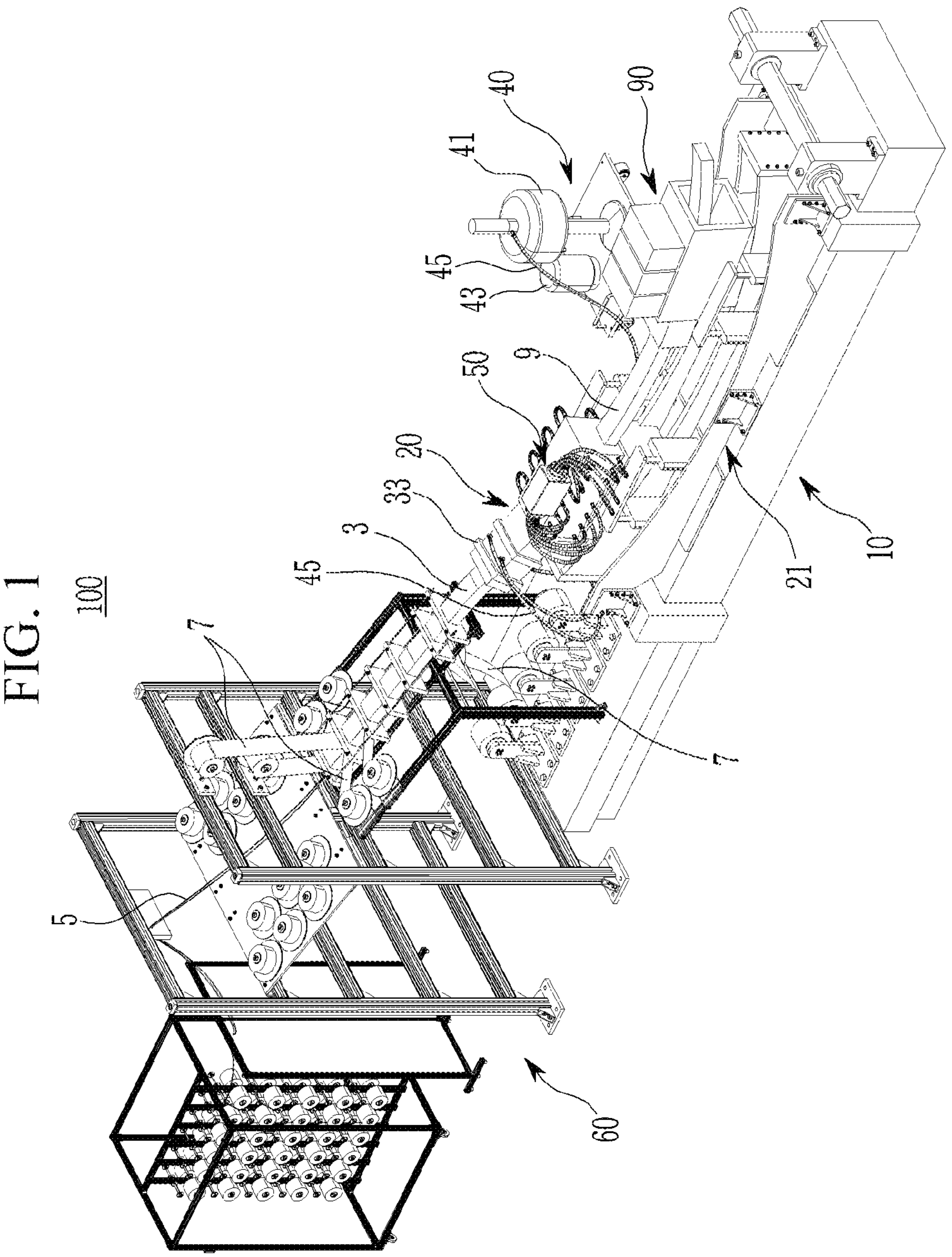
FIG. 1 is a perspective view showing an example of a composite material pultrusion device.
Figure 2:
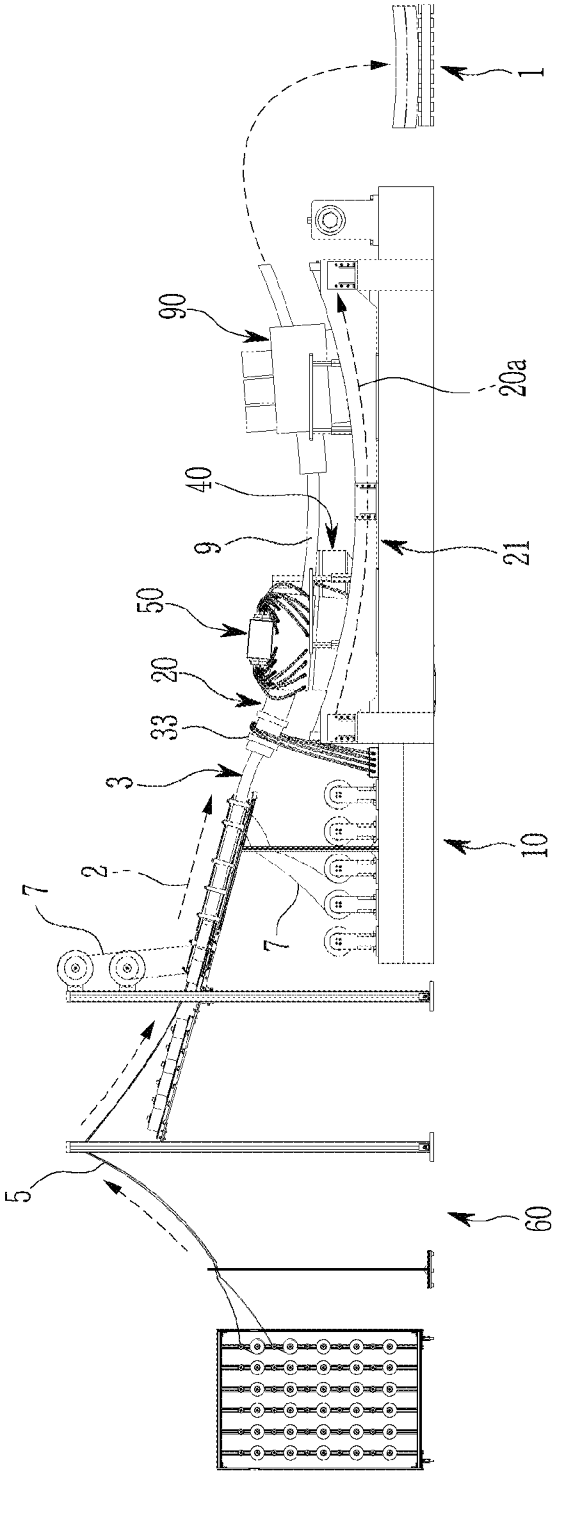
FIG. 2 is a side view showing the composite material pultrusion device.

FIG. 1 is a perspective view showing an example of a composite material pultrusion device, and FIG. 2 is a side view showing the composite material pultrusion device.

Referring to FIGS. 1 and 2, a composite material pultrusion device 100 may be applied to a process of manufacturing a composite material part 1 as a vehicle body part to be assembled into a vehicle body of a vehicle.

In some examples, an example of composite material may include fiber reinforced plastic (FRP), carbon fiber reinforced plastic (CFRP), or glass fiber reinforced plastic (GFRP).

However, a protection scope of the present disclosure should not be understood as being limited to manufacturing the composite material part 1 as the vehicle body part, and a technical spirit of the present disclosure may be applied to manufacturing composite material parts of various types and purposes, such as body parts of next-generation mobility (e.g., aviation mobility).

The composite material pultrusion device 100 may continuously produce the composite material part 1 having a set curvature that is molded by a pultrusion method.

In some examples, the composite material part 1 having the set curvature may include, for example, the filler part, roof rail part, and underbody member of the vehicle body.

Figure 3A:
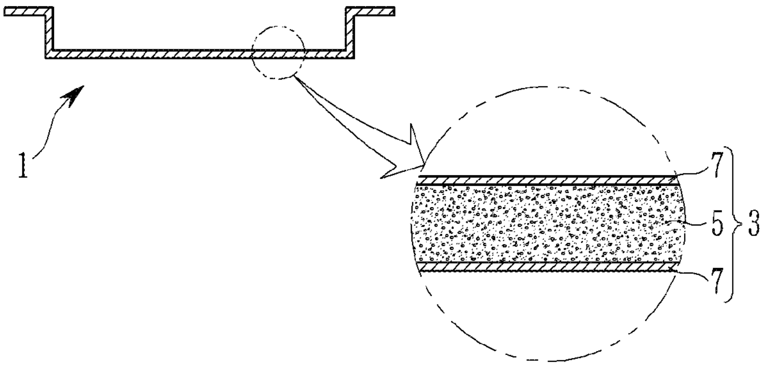
FIGS. 3A and 3B are schematic views each showing an example of a composite material part pultruded by the composite material pultrusion device.
Figure 3B:
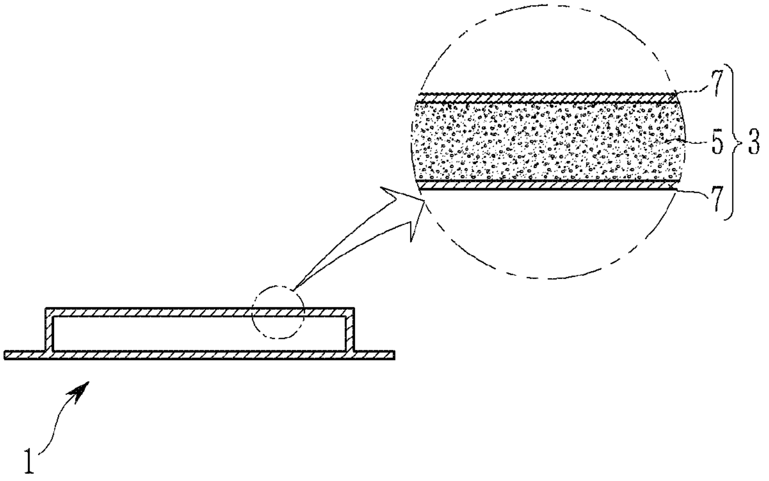

The composite material part 1 as described above may be a part having an open cross-section as shown in FIG. 3A, or may be a part having a closed cross-section as shown in FIG. 3B.

The composite material part 1 may be manufactured through a process of impregnating resin into a fiber material 3 that is transported along a set path, and molding the fiber material 3 impregnated with the resin into a set shape while heat-curing the same.

The fiber material 3 as described above may include, for example, fiber yarns 5 and a fiber nonwoven fabric 7 wrapping the fiber yarns 5.

In the specification, a reference direction for describing the following components may be set as a pultrusion process direction (e.g., front-back direction) of the composite material part 1, a left-right direction or an up-down direction, intersecting the front-back direction.

Further, in the specification, the "upper end portion", "upper part", "upper end" or "upper surface" of a component may indicate the end portion, part, end or surface of a component disposed on a relatively upper side in the drawings, and the "lower end portion", "lower part", "lower end" or "lower surface" of a component may indicate the end portion, part, end or surface of a component disposed on a relatively lower side in the drawings.

Furthermore, in the specification, an end portion (e.g., one end portion or another/the other end portion) of a component may indicate an end of the component in any one direction, and an end portion (e.g., one end portion or another/the other end portion) of a component may indicate a certain portion of the component including its end.

The composite material pultrusion device 100 may pultrude the curved composite material part 1 having the set curvature by using a simple configuration.

To this end, the composite material pultrusion device 100 may include a base frame 10, a molding mold 20, a resin supply 40, a heater 50, a fiber material supply 60, and a pull-cutter 90.

In some implementations, the base frame 10 may be fixed to a floor surface of a process workplace or may be disposed to be movable to any position on the floor surface.

The base frame 10 may be mounted with various components described below. The base frame 10 may include one frame or two or more partitioned frames.

The base frame 10 may include various auxiliary elements such as brackets, bars, rods, plates, housings, cases, blocks, and bulkheads that are designed to support the respective components.

However, these various auxiliary elements are provided for mounting the respective components described below on the base frame 10. Therefore, in some implementations, the various auxiliary elements are collectively referred to as the base frame 10 except in an exceptional case.

In some implementations, the molding mold 20 may impregnate resin into the fiber material 3 supplied by the fiber material supply 60 described below, and heat-cure the fiber material 3 impregnated with the resin to thus mold the same into the set shape.

Figure 4:
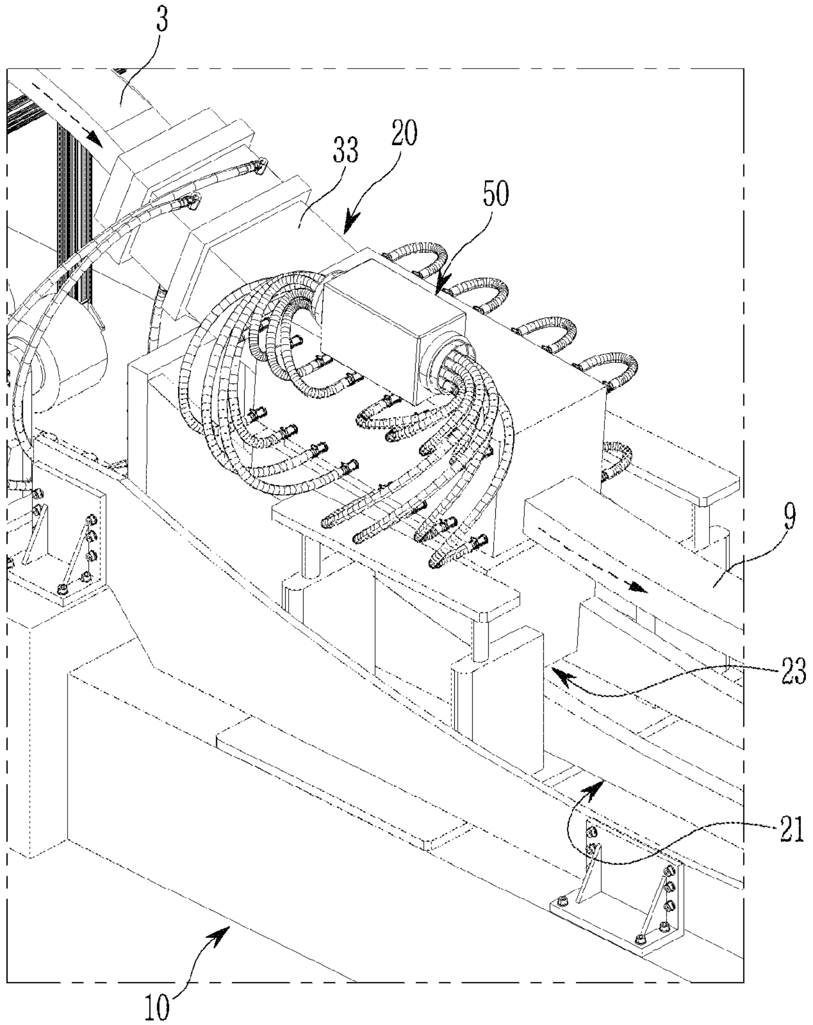
FIG. 4 is a perspective view showing an example of a molding mold applied to the composite material pultrusion device.
Figure 5:
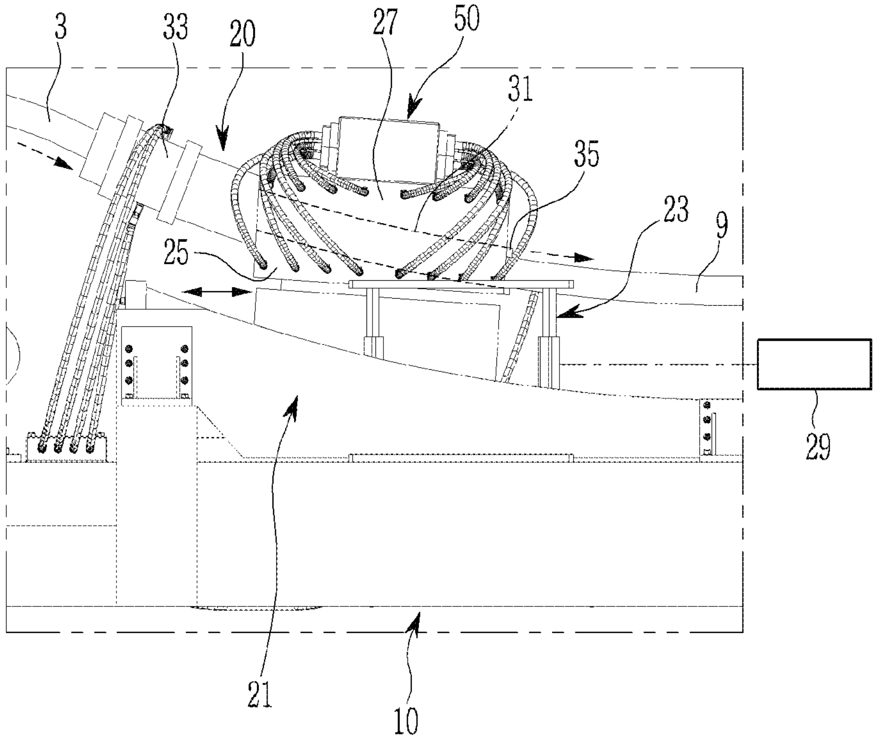
FIG. 5 is a side view schematically showing an example configuration of the molding mold applied to the composite material pultrusion device.

FIG. 4 is a perspective view showing a molding mold applied to the composite material pultrusion device, and FIG. 5 is a side view schematically showing a configuration of the molding mold applied to the composite material pultrusion device.

Referring to FIGS. 1, 2, 4, and 5, the molding mold 20 may be installed on a round-shaped curved rail 21 mounted on the base frame 10.

In some examples, the curved rail 21 may be mounted on the base frame 10 along a pultrusion line 20*a*. That is, the curved rail 21 may have a curved section that is rounded downward from its two ends in the front-back direction.

Furthermore, the molding mold 20 may be installed on the curved rail 21 to be moved back and forth along the pultrusion line 20*a* in the front-back direction.

The molding mold 20 may include a mold support member 23, a lower die 25, and an upper die 27.

The mold support member 23 may support the lower die 25 and the upper die 27, which are described below, and be moved back and forth along the round section of the curved rail 21 in the front-back direction.

The mold support member 23 may be mounted on the curved rail 21 to be movable along the pultrusion line 20*a*.

The mold support member 23 may be moved back and forth along the curved rail 21 by driving a mold driver 29. The mold driver 29 may be installed on the base frame 10, and is operably connected to the mold support member 23.

In one example, the mold driver 29 may include a hydraulic or pneumatic cylinder. In another example, the mold driver 29 may include a moving device for converting a rotary motion of a servo motor into a linear motion by using a power conversion unit. The detailed configuration and operation of the mold driver 29 are omitted.

In addition, the lower die 25 and the upper die 27 may be coupled or separated from each other in the up-down direction, and installed on the mold support member 23.

A pultrusion passage 31 for pultruding the fiber material 3 may be disposed between the lower die 25 and the upper die 27. The pultrusion passage 31 may include a curved mold passage corresponding to the set curvature of the composite material part 1.

In some examples, the molding mold 20 may include a material input port 33 for inputting the fiber material 3 into the pultrusion passage 31, and a molded article extraction unit 35 for extracting a material molded article 9 pultruded from the pultrusion passage 31. The material input port 33 and the molded article extraction unit 35 may be connected to the pultrusion passage 31 in the front-back direction.

Figure 6:
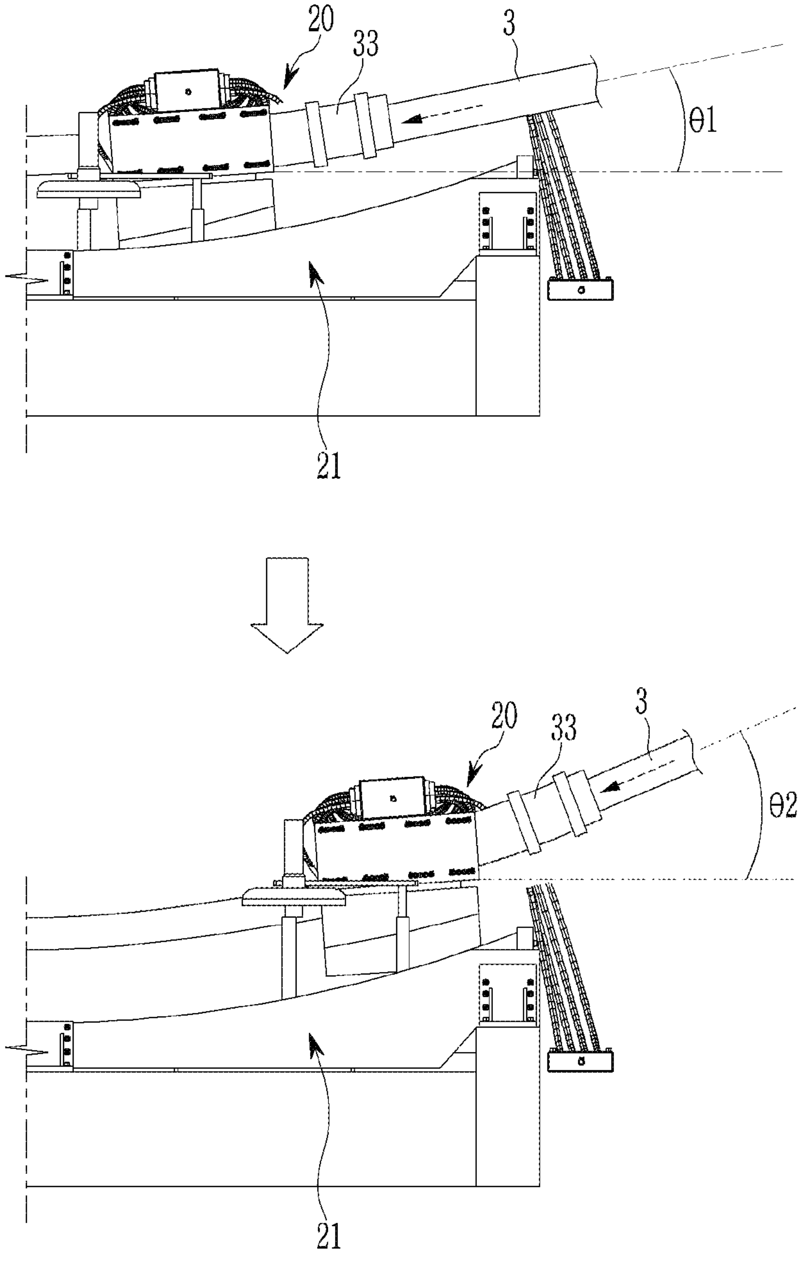
FIG. 6 is a view showing an example placement state of the molding mold applied to the composite material pultrusion device.

Furthermore, in some implementations, as shown in FIG. 6, an input angle of the fiber material 3 input into the material input port 33 of the molding mold 20 may be changed based on a position of the molding mold 20 disposed on the curved rail 21.

To this end, in one example, when pultruding the composite material part 1 having a relatively small curvature, the molding mold 20 may have the pultrusion passage 31 having a curve corresponding to the set curvature of the composite material part 1, and may be disposed in a section between the two ends of the curved rail 21.

In addition, in another example, when pultruding the composite material part 1 having a relatively large curvature, the molding mold 20 may have the pultrusion passage 31 having a curve corresponding to the set curvature of the composite material part 1, and may be disposed in the section between the two ends of the curved rail 21.

In some examples, an input angle θ1 of the fiber material 3 input into the material input port 33 of the molding mold 20 according to the one example may be smaller than an input angle θ2 of the fiber material 3 input into the material input port 33 of the molding mold 20 according to another example. In other words, the input angle θ2 of the fiber material 3 input into the material input port 33 of the molding mold 20 according to another example may be larger than the input angle θ1 of the fiber material 3 input into the material input port 33 of the molding mold 20 according to the one example.

In some implementations, referring to FIG. 1, the resin supply 40 may impregnate the resin into the fiber material 3 input into the pultrusion passage 31 (hereinafter, see FIG. 5) by using the material input port 33 of the molding mold 20.

For example, the resin supply 40 may inject resin stored in a resin tank 41 into the pultrusion passage 31 of the molding mold 20 by a pumping pressure of a resin pump 43.

The resin supply 40 may be connected to the upper and lower parts of the molding mold 20 through a plurality of resin supply lines 45. In some examples, the resin supply lines 45 may be connected to the upper and lower parts of the material input port 33 or to the upper and lower parts of the pultrusion passage 31.

In some implementations, referring to FIGS. 4 and 5, the heater 50 may apply heat at a set temperature to the pultrusion passage 31 of the molding mold 20 to thus heat-cure the resin, impregnated in the fiber material 3, in the pultrusion passage 31. The heater 50 may be installed in the lower die 25 and upper die 27 of the molding mold 20.

In some examples, in one example, the heater 50 may circulate a heating medium such as high-temperature water or oil to the lower die 25 or the upper die 27. In another example, the heater 50 may include a heater cartridge inserted into the lower die 25 or the upper die 27.

In some implementations, referring to FIGS. 1 and 2, the fiber material supply 60 may supply the fiber material 3 to the molding mold 20 along a material transportation path 2 inclined in the up-down direction.

In addition, the fiber material supply 60 may horizontally connect the material transportation path 2 with the material input port 33 when the input angle of the fiber material 3 input into the pultrusion passage 31 (hereinafter, see FIG. 5) through the material input port 33 of the molding mold 20 is changed (see FIG. 6) based on the position of the molding mold 20 disposed on the curved rail 21.

The fiber material supply 60 may be disposed in front of the base frame 10. The fiber material supply 60 may supply the fiber material 3 to the molding mold 20 along the material transportation path 2 inclined in the up-down direction.

Figure 7:
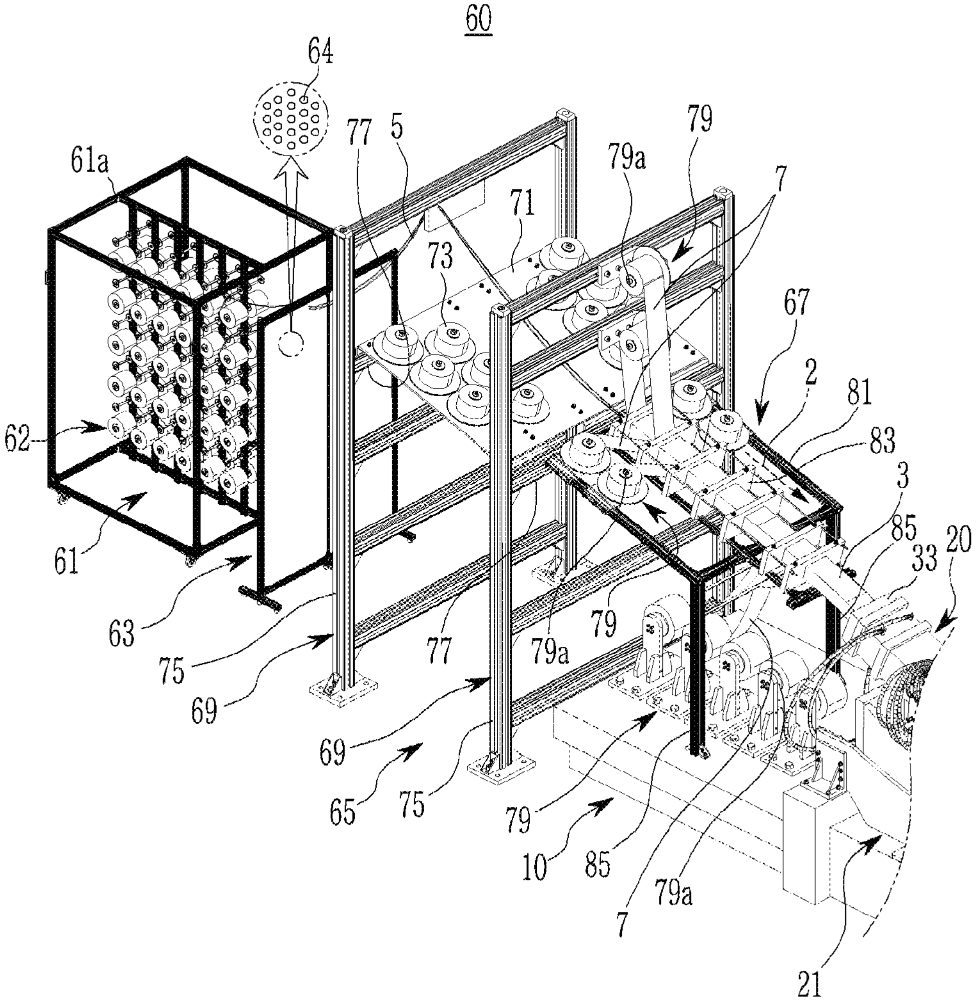
FIG. 7 is a view showing an example of a material supply applied to the composite material pultrusion device.

FIG. 7 is a view showing the fiber material supply applied to the composite material pultrusion device.

Referring to FIG. 7, the fiber material supply 60 may include a creel 61, a yarn guide plate 63, a fiber yarn guide 65, and a material guide 67.

The creel 61 may be installed on a floor of the process workplace. The creel 61 may include a plurality of yarn bobbins 62 on which fiber yarns 5 are wound. The yarn bobbin 62 may be rotatably installed on a creel support 61*a*.

The yarn guide plate 63 may guide the fiber yarn 5 unwound from the yarn bobbin 62. The yarn guide plate 63 may be disposed behind the creel 61, and installed on the floor of the process workplace.

The yarn guide plate 63 may include a number of guide holes 64 through which the fiber yarns 5 pass.

The fiber yarn guide 65 may guide the fiber yarn 5 unwound from the yarn bobbin 62 to the material transportation path 2.

In addition, the fiber yarn guide 65 may be movable in the up-down direction based on the input angle of the fiber material 3 when the input angle of the material of the molding mold 20 is changed (see FIG. 6) based on the position of the molding mold 20 disposed on the curved rail 21. That is, a height of the fiber yarn guide 65 may be adjusted based on the input angle of the fiber material 3.

The fiber yarn guide 65 may be disposed behind the yarn guide plate 63.

Figure 8:
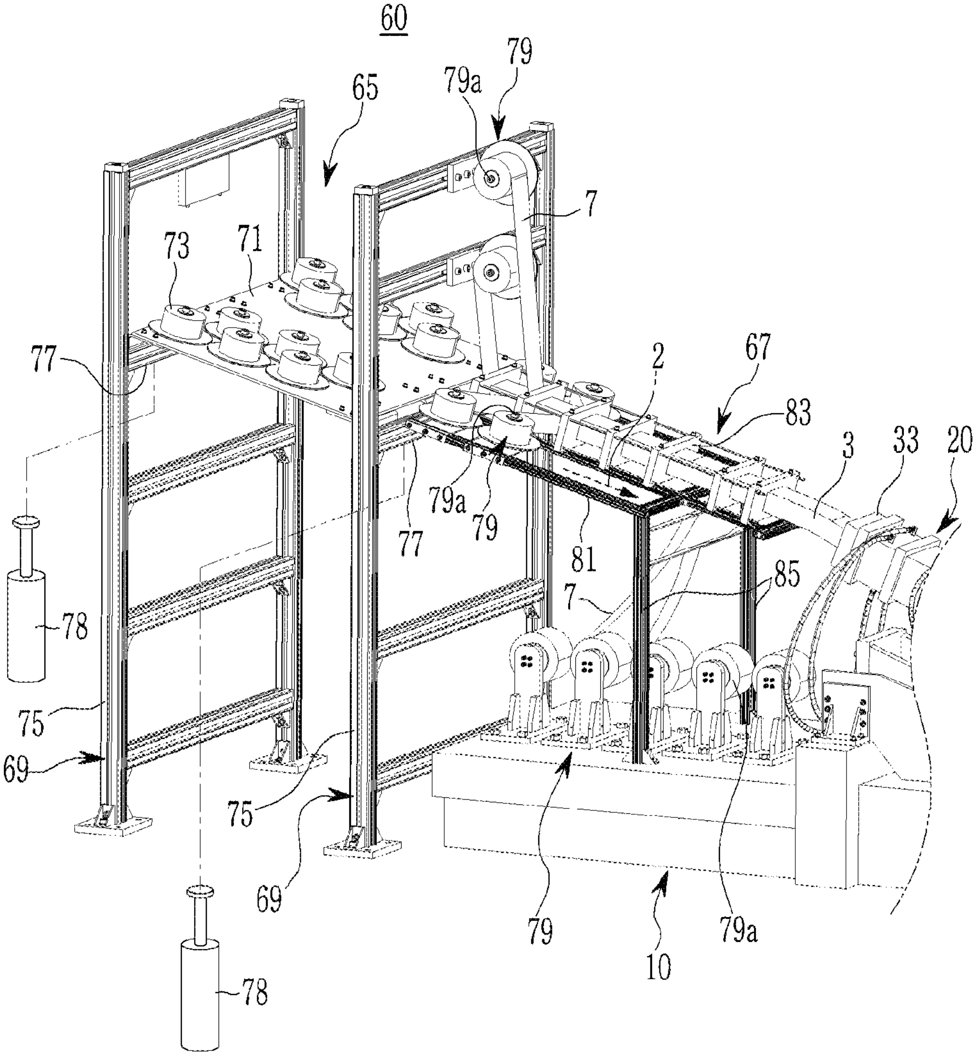
FIGS. 8 and 9 are schematic views showing the configuration and height adjustment structure of the fiber material supply applied to the composite material pultrusion device.
Figure 9:
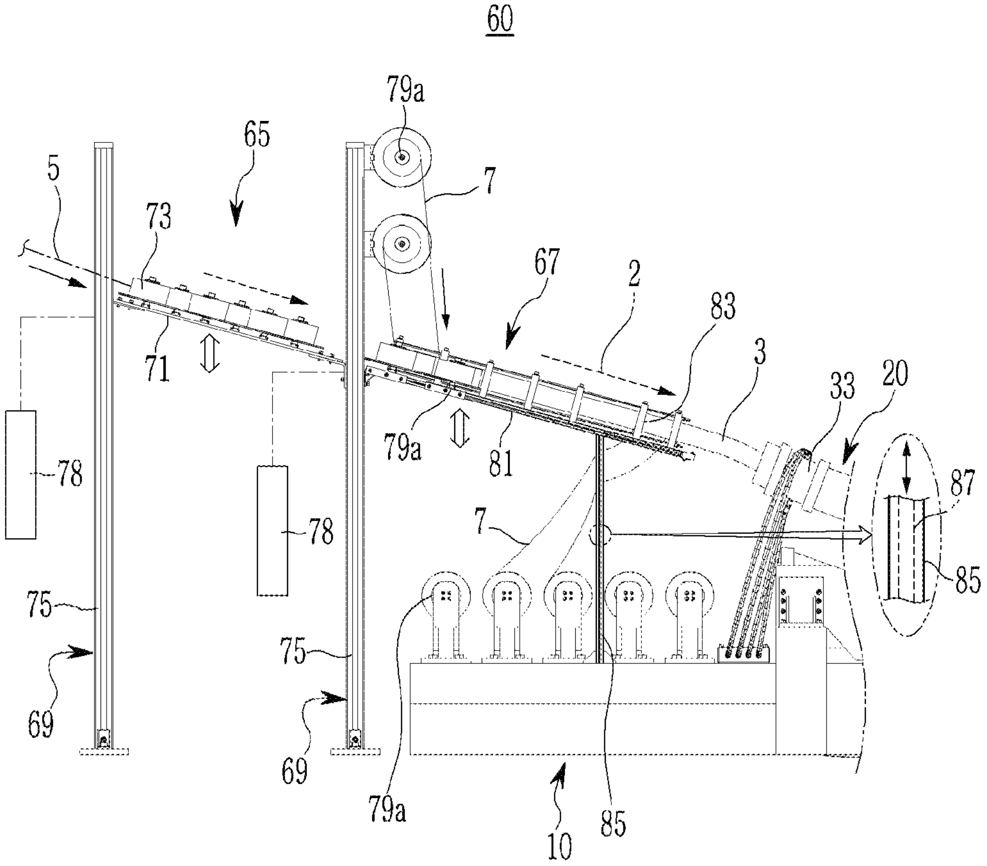

FIGS. 8 and 9 are schematic views showing the configuration and height adjustment structure of the fiber material supply applied to the composite material pultrusion device.

Referring to FIGS. 7 to 9, the fiber yarn guide 65 may include a pair of stands 69, a base plate 71, and a plurality of yarn guide rollers 73.

The stands 69 may be disposed behind the yarn guide plate 63, and installed on the floor of the process workplace. The stands 69 may be spaced apart by a set distance from each other in the front-back direction.

Each stand 69 may include a support frame 75 and a lifting member 77.

The support frame 75 may be a square frame that is erected in the process workplace in the up-down direction.

The lifting member 77 may be mounted on the support frame 75 to be movable in the up-down direction. The lifting member 77 may be coupled to a guide rail disposed on the support frame 75 to be movable in the up-down direction.

The lifting member 77 may be moved back and forth along the guide rail in the up-down direction by driving a lifting driver 78. The lifting driver 78 may be installed on the support frame 75, and operably connected to the lifting member 77.

In one example, the lifting driver 78 may include a hydraulic or pneumatic cylinder. In another example, the lifting driver 78 may include a moving device for converting the rotary motion of the servo motor into the linear motion by using the power conversion unit. The detailed configuration and operation of the lifting driver 78 are omitted.

The base plate 71 may be disposed between the stands 69 to be inclined in the up-down direction along the material transportation path 2. The base plate 71 may be coupled with the lifting member 77.

In addition, the yarn guide roller 73 may guide the fiber yarn 5 along the material transportation path 2. The yarn guide roller 73 may be rotatably installed on an upper surface of the base plate 71.

Referring to FIGS. 7 to 9, the material guide 67 may guide the fiber yarn 5, which is supplied through the creel 61, the yarn guide plate 63, and the fiber yarn guide 65, and the fiber nonwoven fabric 7, which is supplied through a fiber nonwoven fabric supply 79, along the material transportation path 2.

The material guide 67 may be horizontally connected to the fiber yarn guide 65 along the material transportation path 2. That is, the material guide 67 may be connected to the base plate 71 through the lifting member 77 of the fiber yarn guide 65.

The material guide 67 may include a guide frame 81 and a plurality of material guide plates 83.

The guide frame 81 may be coupled with the lifting member 77 of the stand 69 disposed at the rear among the stands 69 of the fiber yarn guide 65, that is, the stand 69 disposed to be adjacent to the molding mold 20.

The guide frame 81 may be moved back and forth in the up-down direction together with the base plate 71 of the fiber yarn guide 65 through the lifting member 77 by driving the lifting driver 78.

In some examples, the guide frame 81 may include a pair of support rods 87 (see FIG. 9). The support rods 87 may be fitted in the up-down direction to a pair of guide pipes 85, which are fixed to the base frame 10 in the up-down direction. Accordingly, the guide frame 81 may be moved back and forth in the up-down direction along the guide pipe 85 via the support rod 87.

In addition, the material guide plates 83 may guide the fiber material 3 including the fiber yarn 5 and the fiber nonwoven fabric 7 along the material transportation path 2. The material guide plate 83 may be installed on an upper part of the guide frame 81.

The material guide plates 83 may be spaced apart by a set distance from each other along the material transportation path 2. The fiber yarn 5 and the fiber nonwoven fabric 7 may be transported to the material input port 33 of the molding mold 20 along the material transportation path 2 while passing through the material guide plates 83.

In some examples, the fiber nonwoven fabric supply 79 described above may supply, to the material transportation path 2, the fiber nonwoven fabric 7 wrapping the fiber yarns 5 together with the fiber yarns 5.

The fiber nonwoven fabric supply 79 may include a plurality of nonwoven fabric bobbins 79*a* installed on the stand 69 disposed to be adjacent to the molding mold 20, the guide frame 81, and the base frame 10. The nonwoven fabric bobbin 79*a* may be rotatably installed on the stand 69, the guide frame 81, or the base frame 10.

In some implementations, referring to FIGS. 1 and 2, the pull-cutter may pull the material molded article 9 molded by the molding mold 20, and cut the same to a set length.

The pull-cutter 90 may be installed on the curved rail 21 to be movable towards or away from the molding mold 20 along the pultrusion line 20*a*.

Figure 10:
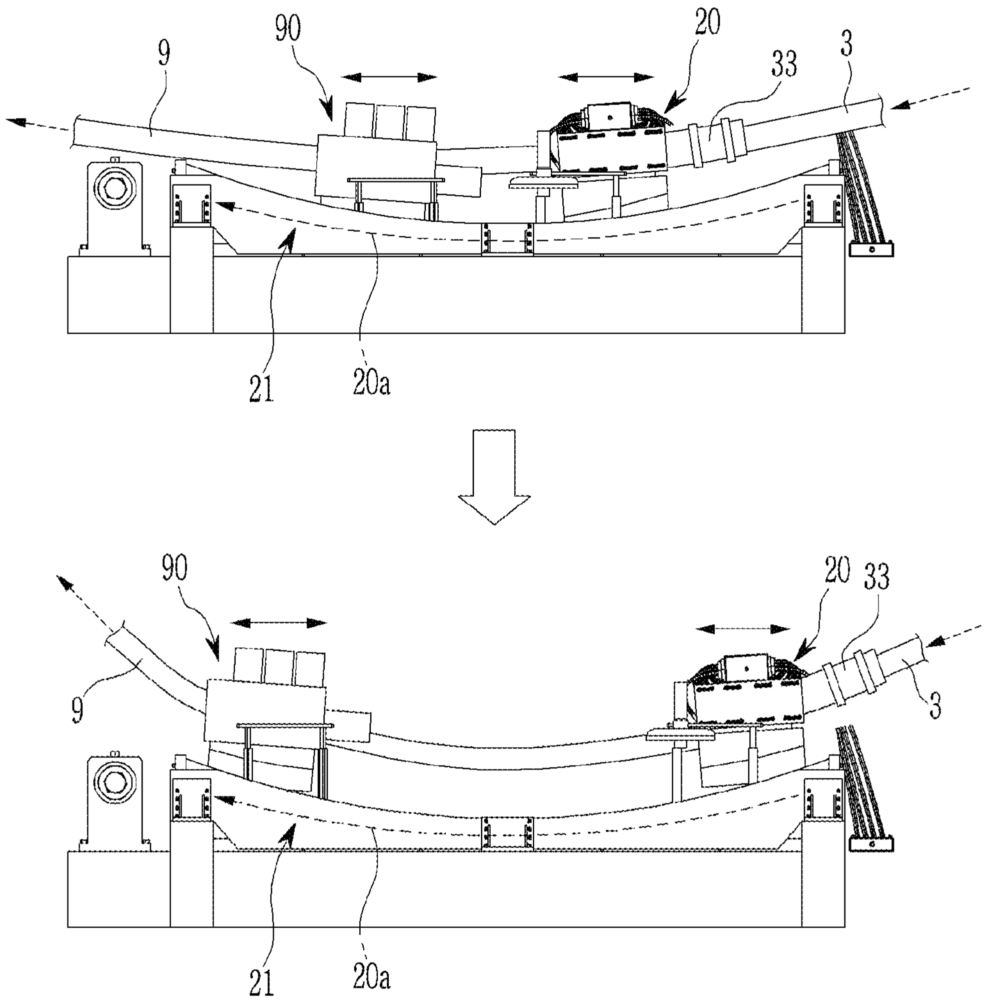
FIG. 10 is a view showing arrangement structures of the molding mold and a pull-cutter, applied to the composite material pultrusion device.

In some examples, as shown in FIG. 10, the molding mold 20 and the pull-cutter 90 may be disposed on the curved rail 21 while having different separation distances as the input angle of the fiber material 3 input into the material input port 33 of the molding mold 20 is changed based on the position of the molding mold 20 disposed on the curved rail 21.

In detail, in one example, the molding mold 20 and the pull-cutter 90 may be moved on the curved rail 21 to be closer to each other when the molding mold 20 pultrudes the composite material part 1 (hereinafter, see FIG. 2) which has the relatively small curvature.

In addition, in another example, the molding mold 20 and the pull-cutter 90 may be moved on the curved rail 21 to be moved away from each other when the molding mold 20 pultrudes the composite material part 1 which has the relatively large curvature.

Figure 11:
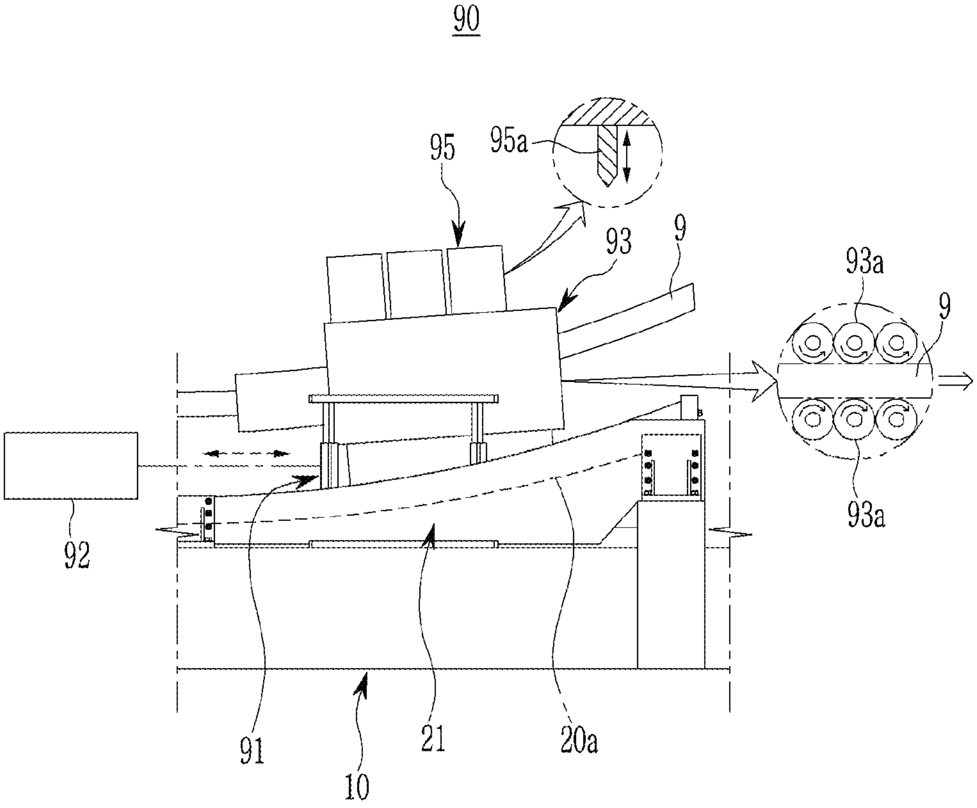
FIG. 11 is a view showing the pull-cutter applied to the composite material pultrusion device.

FIG. 11 is a view showing the pull-cutter applied to the composite material pultrusion device.

Referring to FIG. 11, the pull-cutter 90 may include a puller support member 91, a puller 93, and a cutter 95.

The puller support member 91 may support the puller 93 and cutter 95, which are described below, and be moved back and forth in the front-back direction along the round section of the curved rail 21.

The puller support member 91 may be mounted on the curved rail 21 to be movable back and forth along the pultrusion line 20*a*.

The puller support member 91 may be moved back and forth along the curved rail 21 by driving a unit driver 92. The unit driver 92 may be installed on the base frame 10, and operably connected to the puller support member 91.

In one example, the unit driver 92 may include a hydraulic or pneumatic cylinder. In another example, the unit driver 92 may include a moving device for converting the rotary motion of the servo motor into the linear motion by using the power conversion unit. The detailed configuration and operation of the unit driver 92 are omitted.

The puller 93 may pull the material molded article 9, which is molded by the molding mold 20, along the pultrusion line 20*a*. The puller 93 may be installed on the puller support member 91.

The puller 93 may pull the material molded article 9 by a plurality of pull rollers 93*a* rotated by a driving source.

In addition, the cutter 95 may cut the material molded article 9 pulled by the puller 93 into the set length. The cutter 95 may be installed on the puller 93.

The cutter 95 may cut the material molded article 9 by a cutter 95*a* operated by the driving source.

Figure 12:
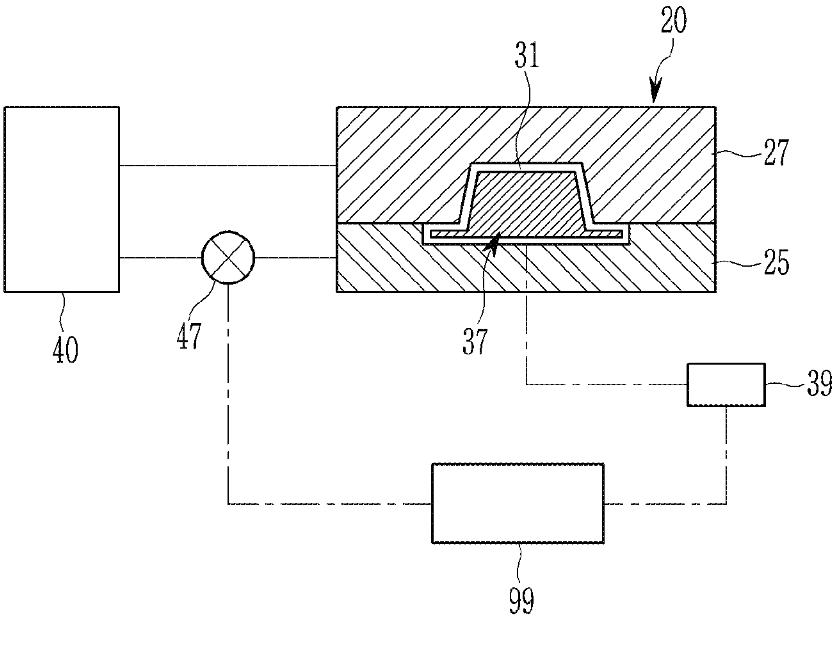
FIG. 12 is a view schematically showing an example of the molding mold applied to the composite material pultrusion device.

In some examples, as shown in FIG. 12, the molding mold 20 may further include at least one mandrel core 37 and a sag detection sensor 39.

At least one mandrel core 37 may pultrude, through the molding mold 20, the composite material part 1 having the closed cross-section as shown in FIG. 3B.

At least one mandrel core 37 may be installed in the pultrusion passage 31 between the lower die 25 and upper die 27 of the molding mold 20 along the pultrusion line 20*a* (see FIG. 2).

In some examples, at least one mandrel core 37 may be fastened to the upper die 27 in the pultrusion passage 31. Furthermore, one end of at least one mandrel core 37 may be fastened to the upper die 27.

In one example, at least one mandrel core 37 may be bent to a set curvature to be mounted on the curved pultrusion passage 31, and in another example, at least one mandrel core 37 may have a plurality of mandrel parts connected with each other in a chain shape.

In addition, the sag detection sensor 39 may detect sagging of at least one mandrel core 37 disposed in the pultrusion passage 31 of the molding mold 20 due to its own weight, and output a detection signal to a controller 99.

The sag detection sensor 39 may be installed at the pultrusion passage 31. The sag detection sensor 39 may include a position sensor.

In some examples, the controller 99 may be a controller controlling overall operations of the composite material pultrusion device 100.

The controller 99 may be implemented as at least one control processor operated based on a set program, and may include a series of instructions for performing contents. In some examples, the controller 99 may include an electric circuit.

In some examples, the resin supply 40 may be connected to the upper and lower parts of the pultrusion passage 31 through the lower die 25 and upper die 27 of the molding mold 20.

Furthermore, the resin supply 40 may include a pressure regulator 47 for regulating a pressure of the resin supplied to the lower part of the pultrusion passage 31.

The pressure regulator 47 may change opening of a valve and may regulate the pressure of the resin supplied to the lower part of the pultrusion passage 31. The pressure regulator 47 may include, for example, a pressure regulation valve.

In some examples, the resin supply 40 may supply the resin to the upper and lower parts of the pultrusion passage 31 at the same pressure. In addition, the resin supply 40 may supply the resin at different pressures to the upper and lower parts of the pultrusion passage 31 by an operation of the pressure regulator 47.

In some examples, the controller 99 may apply a control signal to the pressure regulator 47 based on the detection signal acquired from the sag detection sensor 39.

For example, the controller 99 may receive the detection signal from the sag detection sensor 39 to determine that at least one mandrel core 37 in the pultrusion passage 31 is sagged due to its own weight, and apply the control signal to the pressure regulator 47.

Accordingly, the pressure regulator 47 may be operated by the control signal, and increase the pressure of the resin supplied to the lower part of the pultrusion passage 31. Therefore, at least one mandrel core 37 disposed in the pultrusion passage 31 may be lifted by the pressure of the resin injected into the lower part of the pultrusion passage 31.

Hereinafter, the description describes an operation of the composite material pultrusion device 100 configured as described above in detail with reference to FIGS. 1 through 12.

In some implementations, the molding mold 20 may be configured to pultrude the composite material part 1. The molding mold 20 may include the pultrusion passage 31 having the curve corresponding to the curvature of the composite material part 1 to be pultruded.

The molding mold 20 may be disposed on the curved rail 21 to be movable along the pultrusion line 20*a* together with the pull-cutter 90.

In some examples, when the composite material part 1 having the relatively small curvature is pultruded through the molding mold 20, the molding mold 20 and the pull-cutter 90 may be moved on the curved rail 21 to be closer to each other.

In some examples, when the composite material part 1 having the relatively small curvature is pultruded through the molding mold 20, the molding mold 20 and the pull-cutter 90 may be moved on the curved rail 21 to be further away from each other.

In some examples, the molding mold 20 may be moved along the curved rail 21 by driving the mold driver 29, and the pull-cutter 90 may be moved along the curved rail 21 by driving the unit driver 92.

Furthermore, at least one mandrel core 37 may be disposed in the pultrusion passage 31 of the molding mold 20 when the composite material part 1 having the closed cross-section is pultruded through the molding mold 20.

As described above, the position of the molding mold 20 disposed on the curved rail 21 may be different based on the curvature of the composite material part 1 to be pultruded. Therefore, the input angle $\theta 1$ or $\theta 2$ (in FIG. 6) of the fiber material 3 input into the material input port 33 of the molding mold 20 may also be different.

Accordingly, the fiber yarn guide 65 and material guide 67 of the fiber material supply 60 may be horizontally connected to the material input port 33 of the molding mold 20 while being moved based on the input angle of the fiber material 3 in the up-down direction.

In some implementations, the base plate 71 of the fiber yarn guide 65 and the guide frame 81 of the material guide 67 may be horizontally connected with each other to be inclined along the material transportation path 2 in the up-down direction.

In some examples, the base plate 71 installed with the yarn guide rollers 73 may be coupled with the lifting member 77 mounted on the stand 69 to be movable in the up-down direction. In addition, the guide frame 81 installed with the material guide plates 83 may be coupled with the lifting member 77 of the stand 69 disposed at the rear among the stands 69.

In this state, the lifting member 77 may be moved in the up-down direction by driving the lifting driver 78. Accordingly, the base plate 71 and the guide frame 81 may be moved by the lifting member 77 in the up-down direction.

Then, heights of the base plate 71 and the guide frame 81 may be adjusted based on a set material input angle of the molding mold 20.

Therefore, the material input port 33 of the molding mold 20, which is disposed at a set position on the curved rail 21 based on the curvature of the composite material part 1 to be pultruded, may be horizontally connected with the fiber yarn guide 65 and the material guide 67 through the material transportation path 2.

That is, the material input port 33 of the molding mold 20, the fiber yarn guide 65, and the material guide 67 may be horizontally connected with one another along the material transportation path 2 inclined in the up-down direction.

After this process, the creel 61, yarn guide plate 63, fiber yarn guide 65, and material guide 67 of the fiber material supply 60 may supply the fiber material 3 along the material transportation path 2 to the material input port 33 of the molding mold 20.

To describe this process in detail, the fiber yarn 5 wound on the yarn bobbin 62 of the creel 61 may be unwound and supplied to the fiber yarn guide 65 through the guide hole 64 of the yarn guide plate 63.

In addition, the fiber yarn 5 may be supplied to the guide frame 81 of the material guide 67 by the yarn guide roller 73 on the base plate 71 of the fiber yarn guide 65.

In some examples, the base plate 71 and the guide frame 81 may be horizontally connected with each other to be inclined in the up-down direction, and the fiber yarn 5 may thus be smoothly supplied to the material transportation path 2 through the material guide plate 83 of the material guide 67.

In this process, the fiber nonwoven fabric 7 wound on the nonwoven fabric bobbin 79*a* of the fiber nonwoven fabric supply 79 may be unwound and supplied to the material transportation path 2 through the material guide plate 83.

Then, the fiber nonwoven fabric 7 may wrap the fiber yarn 5, and the fiber material 3 including the fiber yarn 5 and the fiber nonwoven fabric 7 may be supplied to the material input port 33 of the molding mold 20 along the material transportation path 2.

In some examples, the material transportation path 2 may be horizontally connected to the material input port 33 of the molding mold 20, which has a different material input angle based on the curvature of the composite material part 1 to be pultruded.

Therefore, the fiber material 3 may be horizontally input into the material input port 33 of the molding mold 20 along the material transportation path 2, and supplied to the pultrusion passage 31 of the molding mold 20.

Accordingly, the composite material pultrusion device 100 may minimize the dimensional deviation and damage of the fiber material 3 supplied to the pultrusion passage 31 of the molding mold 20.

In a process of supplying the fiber material 3 to the pultrusion passage 31 of the molding mold 20 as described above, the resin supply 40 may inject the resin into the pultrusion passage 31 at the set pressure, and impregnate the resin into the fiber material 3 in the pultrusion passage 31. In some examples, the resin supply 40 may supply the resin to the upper and lower parts of the pultrusion passage 31 at the same pressure.

In some examples, at least one mandrel core 37 may be mounted in the pultrusion passage 31 of the molding mold 20 when the composite material part 1 having the closed cross-section is pultruded through the molding mold 20.

In this case, the sag detection sensor 39 may detect that at least one mandrel core 37 is sagged due to its own weight and output the detection signal to the controller 99.

Accordingly, the controller 99 may acquire the detection signal from the sag detection sensor 39, and apply the control signal to the pressure regulator 47 when determining that at least one mandrel core 37 is sagged from a set reference position based on the detection signal.

Then, the pressure regulator 47 may be operated by the control signal, and increase the pressure of the resin supplied to the lower part of the pultrusion passage 31.

Therefore, at least one mandrel core 37 may be lifted upward from the pultrusion passage 31 by the pressure of the resin injected into the lower part of the pultrusion passage 31.

Accordingly, at least one mandrel core 37 may be correctly disposed in the pultrusion passage 31 along the pultrusion line 20*a*.

In the state where the fiber material 3 is impregnated with the resin in the pultrusion passage 31, the heater 50 may apply heat at the set temperature in the pultrusion passage 31 of the molding mold 20 to thus heat-cure the resin impregnated in the fiber material 3.

As the fiber material 3 impregnated with the resin is heat-cured in the pultrusion passage 31, the molding mold 20 may continuously mold the material molded article 9 of the set shape, and continuously extract the material molded article 9 through the molded article extraction unit 35 of the molding mold 20.

As described above, the material molded article 9 extracted through the molded article extraction unit 35 may be supplied to the pull-cutter 90.

Then, the puller 93 of the pull-cutter 90 may pull the material molded article 9 along the pultrusion line 20*a*, and the cutter 95 may cut the material molded article 9 to the set length.

Therefore, the composite material pultrusion device 100 may pultrude the composite material part 1 having the set curvature by going through the series of processes as described above.

The composite material pultrusion device 100 as described hereinabove may manufacture the composite material part 1 having the set curvature, such as the pillar part, roof rail part, and underbody member of the vehicle body.

In the composite material pultrusion device 100, the input angle of the fiber material 3 into the molding mold 20 may be changed based on the curvature of the composite material part 1 to be pultruded.

Accordingly, in the composite material pultrusion device 100, the fiber material supply 60 may adjust its upper and lower heights based on the material input angle, thereby horizontally connecting the material input port 33 of the molding mold 20 and the material transportation path 2 with each other.

Therefore, the composite material pultrusion device 100 may horizontally supply the fiber material 3 transported along the material transportation path 2 to the material input port 33 of the molding mold 20.

Accordingly, the composite material pultrusion device 100 may prevent quality problems (for example, cracks) occurring in the composite material part 1 due to the dimensional deviation, non-molding, resin non-impregnation, or the like of the pultruded composite material part 1.

Furthermore, the composite material pultrusion device 100 may pultrude the curved composite material parts 1 of various specifications that have different curvatures by using the simple configuration, thus securing the productivity and quality of the curved composite material parts 1.

Although the implementations of the present disclosure have been described hereinabove, the scope of the present disclosure is not limited thereto, and all equivalent modifications easily modified by those skilled in the art to which the present disclosure pertains are intended to fall within the scope and spirit of the present disclosure.

What is claimed is:

1. A composite material pultrusion device configured to pultrude a curved composite material part, the device comprising:
- a base frame;
- a curved rail with an upper curved surface that is disposed on the base frame and defining a pultrusion line;
- a fiber material supply configured to supply a fiber material along a material transportation path that is inclined in an up-down direction relative to the base frame;
- a molding mold that defines a pultrusion passage connected to the material transportation path, the molding mold being disposed on the curved rail and configured to move along the pultrusion line;
- a resin supply connected to the molding mold and configured to supply resin into the pultrusion passage; and
- a pull-cutter disposed on the curved rail and configured to move toward or away from the molding mold along the pultrusion line, the pull-cutter being configured to pull and cut a molded article that is molded by the molding mold.

2. The device of claim 1, further comprising:
- a heater disposed at the molding mold and configured to apply heat to the pultrusion passage.

3. The device of claim 1, wherein the molding mold and the pull-cutter are disposed on the curved rail and spaced apart from each other,
- wherein a separation distance between the molding mold and the pull-cutter varies based on a curvature of the curved composite material part,
- wherein the device further comprises a material input port connected to the molding mold and configured to provide the fiber material to the molding mold, and
- wherein an input angle of the fiber material into the material input port varies based on a position of the molding mold.

4. The device of claim 3, wherein the fiber material supply comprises:
- a creel comprising a plurality of yarn bobbins that are wound with fiber yarns;
- a pair of stands that are disposed at one side of the creel; and
- a fiber yarn guide disposed between the pair of stands and inclined in the up-down direction, the fiber yarn guide being configured to move in the up-down direction according to the input angle of the fiber material and configured to guide the fiber yarns unwound from the plurality of yarn bobbins to the material transportation path.

5. The device of claim 4, wherein each of the pair of stands comprises:
- a support frame; and
- a lifting member disposed at the support frame and configured to be moved in the up-down direction, and
- wherein the device further comprises a lifting driver disposed at the support frame and configured to move the lifting member in the up-down direction.

6. The device of claim 5, wherein the fiber yarn guide comprises:

a base plate coupled to the lifting member; and a plurality of yarn guide rollers disposed at the base plate.

7. The device of claim 5, further comprising:

a fiber nonwoven fabric supply configured to supply a fiber nonwoven fabric, wherein the fiber material supply further comprises a material guide connected to the fiber yarn guide and configured to guide the fiber nonwoven fabric along the material transportation path.

8. The device of claim 7, wherein the material guide comprises:

a guide frame coupled to the lifting member of one of the pair of stands that is disposed adjacent to the molding mold; and a plurality of material guide plates disposed at the guide frame along the material transportation path.

9. The device of claim 8, further comprising:

a plurality of guide pipes fixed to the base frame in the up-down direction, wherein the guide frame comprises a plurality of support rods that are fitted to the plurality of guide pipes in the up-down direction.

10. The device of claim 8, wherein the fiber nonwoven fabric supply comprises a plurality of nonwoven fabric bobbins disposed at one of the pair of stands that is disposed adjacent to the molding mold, the guide frame, and the base frame.

11. The device of claim 4, wherein the fiber material supply further comprises:

a yarn guide plate disposed between the creel and one of the pair of stands, the yarn guide plate defining a number of guide holes through which the fiber yarns pass.

12. The device of claim 1, wherein the molding mold comprises:

a mold support member disposed at the curved rail and configured to move along the pultrusion line; and a lower die and an upper die that are disposed at the mold support member and configured to define the pultrusion passage.

13. The device of claim 12, further comprising a mold driver disposed at the base frame and configured to move the mold support member along the pultrusion line.

14. The device of claim 1, wherein the pull-cutter comprises:

a puller support member disposed at the curved rail and configured to move along the pultrusion line;

a puller disposed at the puller support member; and a cutter disposed at the puller.

15. The device of claim 14, further comprising a unit driver disposed at the base frame and configured to move the puller support member along the pultrusion line.

16. The device of claim 12, wherein the molding mold further comprises at least one mandrel core disposed in the pultrusion passage between the upper die and the lower die.

17. The device of claim 16, wherein the molding mold further comprises a sag detection sensor disposed at the pultrusion passage and configured to detect sagging of the at least one mandrel core.

18. The device of claim 17, wherein the resin supply comprises a pressure regulator configured to regulate a pressure of the resin supplied to a lower part of the molding mold based on a detection signal of the sag detection sensor.

19. The device of claim 1, wherein the resin supply is connected to upper and lower parts of the molding mold.

* * * * *